United States Patent [19]

Wolfsgruber et al.

[11] Patent Number: 5,121,386
[45] Date of Patent: Jun. 9, 1992

[54] SYSTEM FOR COMMUNICATION BETWEEN A MASTER AND SLAVE PROCESSING

[75] Inventors: Arturo Wolfsgruber, Milan; Sandro Storti, Sesto San Giovanni; Alberto Coen, Milan, all of Italy

[73] Assignee: SGS-Thomson Microelectronics S.r.l., Italy

[21] Appl. No.: 519,288

[22] Filed: May 4, 1990

[30] Foreign Application Priority Data

May 4, 1989 [IT] Italy ............................ 67327 A/89

[51] Int. Cl.⁵ .................................................. H04J 3/02
[52] U.S. Cl. ...................................... 370/85.1; 370/67
[58] Field of Search ................. 370/100.1, 85.13, 85.6, 370/94.3, 85.1; 340/825.44; 455/343

[56] References Cited

U.S. PATENT DOCUMENTS

| | | | |
|---|---|---|---|
| 4,715,031 | 12/1987 | Crawford et al. | 370/85.6 |
| 4,719,622 | 1/1988 | Whipple et al. | 370/85.1 |
| 4,780,620 | 10/1988 | Hogberg et al. | 370/100.1 |
| 4,847,756 | 7/1989 | Ito et al. | 370/85.1 |
| 4,942,571 | 7/1990 | Moller et al. | 370/85.13 |
| 4,958,343 | 9/1990 | Abramovici et al. | 370/85.1 |

Primary Examiner—Stephen Chin
Assistant Examiner—Dang Ton
Attorney, Agent, or Firm—Gifford, Groh, Sprinkle, Patmore and Anderson

[57] ABSTRACT

A communication system of the multiplex type between a master processing unit incorporating a microprocessor and slave units associated in particular with electrical devices in a vehicle for activating or controlling at least one electrically functioning component of the corresponding device the slave units being connected in groups to the master unit by means of corresponding communication channels, and in which these slave units include logic means for the exchange of communication messages with the master unit and are capable of independently initiating transmission towards the master unit; such messages in particular include a first field for identification of the slave unit which is sending or is to receive the communication, a second data field, and a preliminary field used to activate such units from a resting state of minimum power consumption.

25 Claims, 4 Drawing Sheets

Fig.1

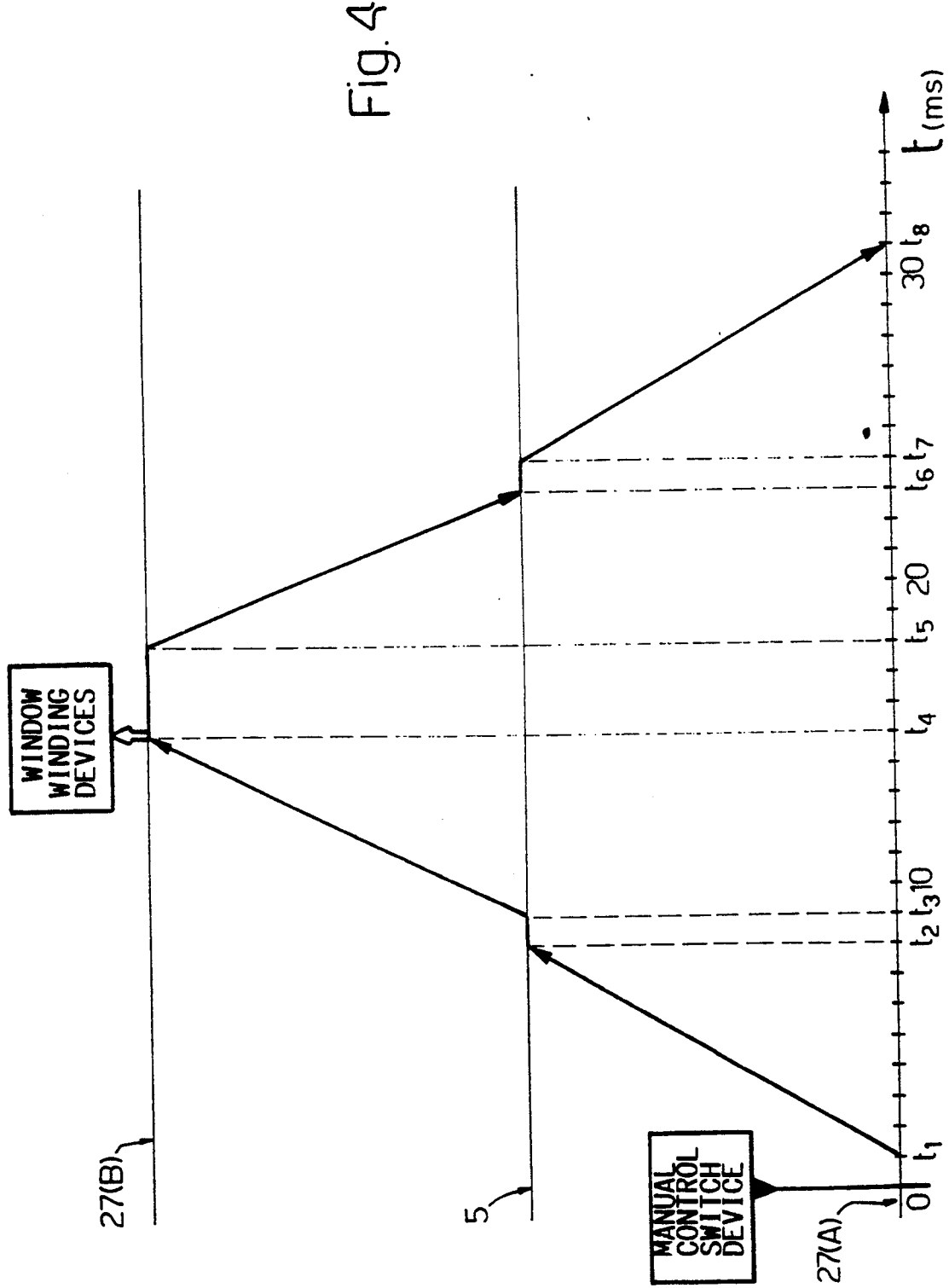

SYSTEM FOR COMMUNICATION BETWEEN A MASTER AND SLAVE PROCESSING

BACKGROUND OF THE INVENTION

This invention relates to a communication system of the multiplex type, that is with an information channel which is accessible to a plurality of users, provided between a master processing unit and slave units with the possibility that information exchange can be initiated from one of the slave units. In particular the communication system according to this invention can be applied to a plurality of units associated with the electrical devices in a vehicle, and especially for activation and control of the electrical devices fitted to a vehicle door, for example, the window winding device, the door locking device, the device actuating various electrical components in an outside rear-view mirror and the manual control switch device for operating the components of the various abovementioned devices as described in Italian patent application No. 67158-A/89 lodged on the Mar. 7, 1989 entitled: "Activation and control system for a plurality of electrical devices in a vehicle".

As known, multimaster systems in which each unit has the characteristics of a master unit and is therefore capable of communicating directly with every other unit are used in communication systems between various units. This has disadvantages in that:

all the units must be approximately equal in complexity because all the units are connected by means of a single data transmission line. A fault in the latter may cause failure of the entire system if redundancy is not provided, but this entails costly duplication and operational difficulties.

The structure of the messages is complex, either because they have to include double addressing, or because of the need to interpret all messages by a single unit.

Master-slave systems have therefore been constructed in which there is a central master unit which controls all communication sending commands to, interrogating or synchronizing the slave units, which in turn can only transmit after these communications have been received. A result of this however is that the master unit must always be active whenever communication is required with any slave unit. In order to overcome this disadvantage while maintaining the structure of the master-slave system additional transmission lines dedicated to communication requests are required.

SUMMARY OF THE INVENTION

The object of this invention is to provide a communication system of the multiplex type between a master processing unit and slave units in which each slave unit, although having the simplified structure of a slave unit, can initiate transmission to the master unit so as to overcome the disadvantages mentioned above, with particular advantage in application to the communication system between a plurality of electrical devices in a vehicle, where it is important to have a relatively simplified system, but with a high guarantee of satisfactory performance, in order to reduce production and installation costs.

In accordance with this invention a communication system is provided between at least one master unit and slave units which are connected to the said master unit by means of one communication channel which is accessible to a plurality of the said units, characterized in that the said slave units include logical means for performing the exchange of communication messages with the said master unit, and are capable of independently initiating transmissions to the said master unit.

BRIEF DESCRIPTION OF THE DRAWINGS

In order to provide a better understanding of this invention a particular embodiment will now be described purely by a way of a non-restrictive example with reference to the appended drawings in which;

FIG. 4 is an illustration of a communication time sequence between units in the system in FIG. 1.

DETAILED DESCRIPTION OF THE INVENTION

The communication system according to this invention between various slave units and a master unit, and therefore between various slave units via a master unit, applies to local transmission networks of the multiplex type, and conveniently to multiplex networks in motor vehicles, for example of the type described in the abovementioned Italian patent application No. 67158-A/89 lodged on the Mar. 7, 1989, the contents of which are incorporated in this description by mere reference where necessary.

Figure 1:
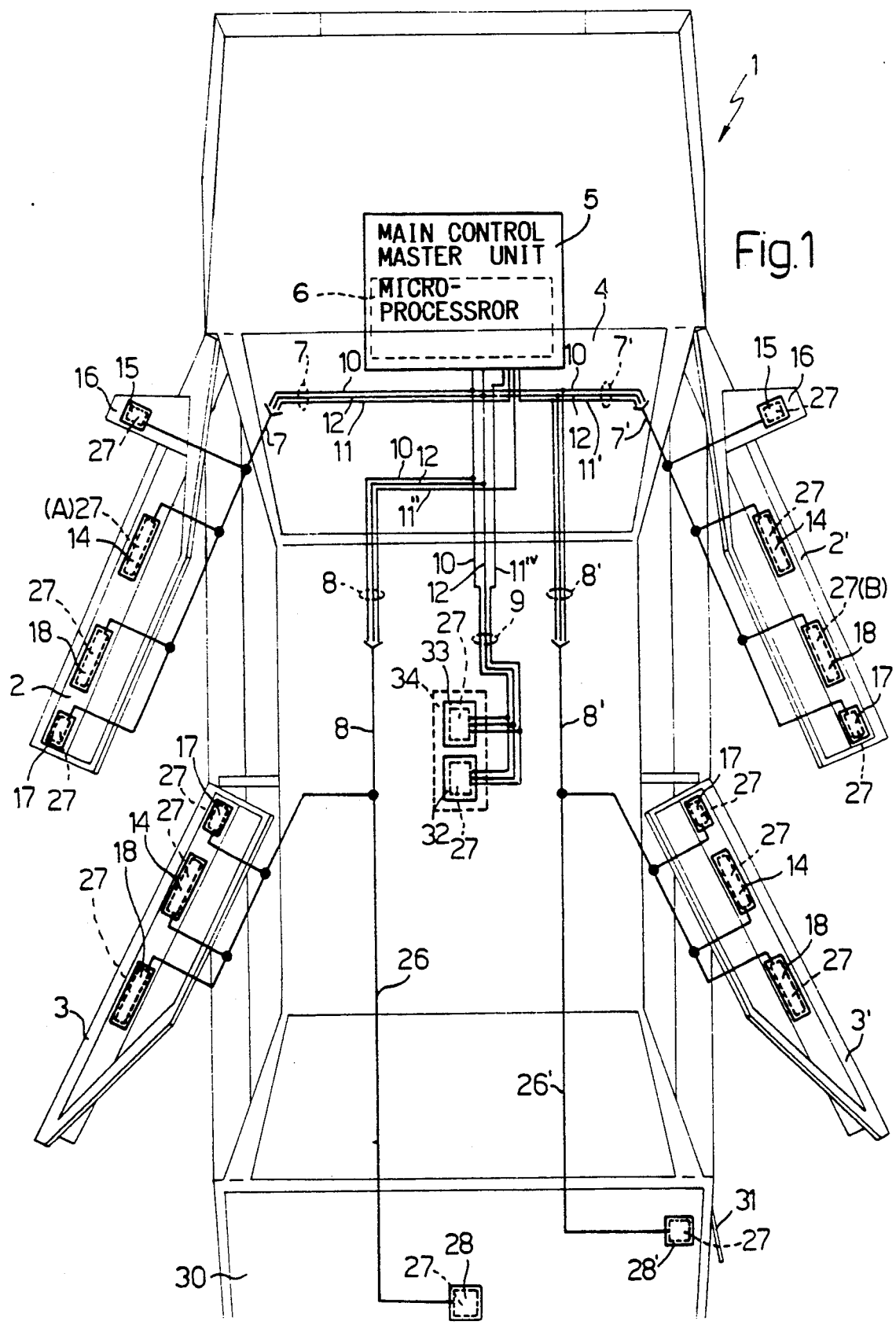
FIG. 1 is a diagrammatical view from above of a motor vehicle to which the communication system for activation and control of a plurality of electrical devices constructed according to this invention is fitted.

FIG. 1 therefore illustrates a motor vehicle 1 including actuator devices provided respectively with slave units connected with a master by means of multiplex connections, forming a communication system according to this invention. This motor vehicle 1 has two front doors 2 and 2', and two rear doors 3 and 3', illustrated in the open position. A main control master unit 5 comprising a microprocessor 6 is housed close to dashboard 4 and from this lead cables 7, 7', 8 and 8' and 9 respectively, each of which consists of a first electrical power supply conductor 10, a second data signal transmission conductor 11 and a third conductor 12 connected to earth.

Cables 7 and 7' go to front doors 2 and 2' respectively, while cables 8 and 8' go to rear doors 3 and 3'. Each of these cables is progressively connected by means of corresponding branches from the three conductors to a corresponding slave unit 27 which is connected respectively to a manual control switch device 14, an electrical control device 15 for an outside rear-view mirror 16, a door locking device 17 and a window winding device 18 for the activation and control thereof. In particular this slave unit 27 conveniently includes a printed circuit to which are connected a first integrated circuit for the distribution of electrical power by means of an activating component (e.g. a small direct current electric motor) of the corresponding device with which slave unit 27 is associated, and a second integrated circuit for the processing of data signals relating to the operation of that component. These first and second integrated circuits form a logic unit and may conveniently include specific logic circuits for a microprocessor, solid state switches, etc., and may form circuits for protection against voltage and current overloads, control and diagnostic circuits, etc.

In the case of device 14 with manual control switches the first integrated circuit is missing, in that there is no power activation, whereas in the case of device 15 for electrical control of the outside rear-view mirror 16 there will be more than one activating member, in that the various electrical components activating orientation movements of the reflecting surface of the rear-view mirror, for altering the orientation of the rear-view mirror body with respect to the door, may be controlled, and a supply may be provided to the components heating the reflecting surface.

In the case of cables 8 and 8' for doors 3 and 3' the connection with electrical control device 15 for outside rear-view mirror 16 will obviously be missing. Cable 8 also passes by means of a branch 26 to a slave unit 27 associated with a device 28, similar to device 17, for locking and releasing a boot 30, while cable 8' passes via a branch 26' to a slave unit 27 associated with a device 28', also similar to device 17, for locking and releasing a flap 31 providing access to a fuel filler cap for motor vehicle 1.

Cable 9 in turn is progressively connected by means of corresponding branches to three conductors, two relating to slave units 27 associated respectively with a first and a second manual control switch device 32 and 33 placed in a zone 34 (console) between the front seats capable of controlling devices 15 for electrical control of outside rear-view mirrors 16 and window winding devices 18.

Figure 2:
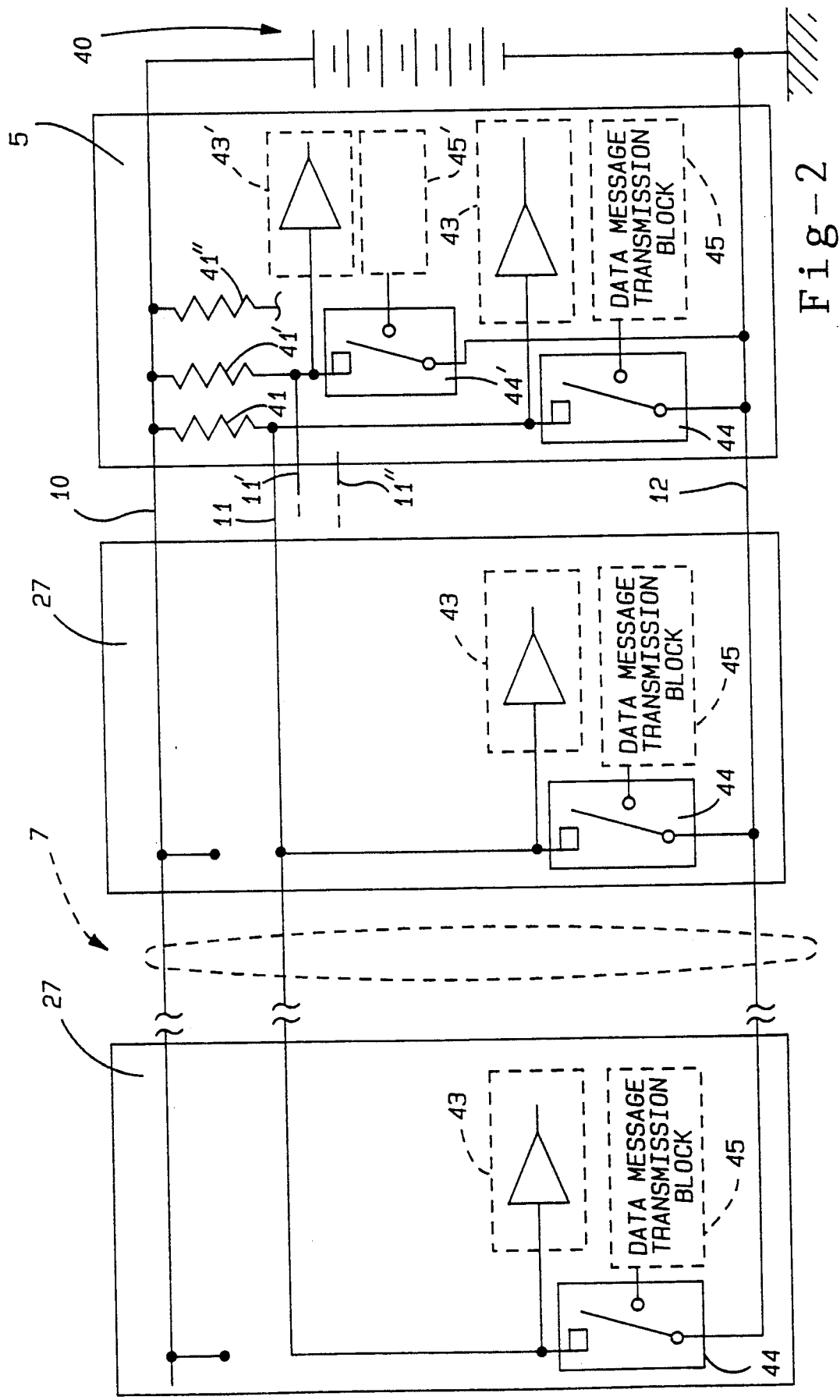
FIG. 2 is a simplified block diagram of the connections between the various units in the system in FIG. 1.

As is illustrated in greater detail in FIG. 2, the main control master unit 5 which is connected to a supply battery 40 is in turn connected to slave units 27 connected for example to cable branch 7 by means of conductor 10 providing a positive electrical power supply, a conductor 11 for the transmission of data signals and a conductor 12 providing a connection to earth. Connection of the various slave units 27 to transmission conductor 11 is of the "wired and" type, in which a return resistor 41 is connected between conductor 11 and positive power conductor 10 in master unit 5, so that the dominant logic level is a "low" logic level, and is subordinate to any of the units which initiates transmission. In both master unit 5 and slave units 27 transmission conductor 11 is in fact connected to the input to corresponding data receipt block 43, while a switch block 44 with a switch which is controlled by a data message transmission block 45 is connected between transmission conductor 11 and earth conductor 12. These blocks 43 and 45 form the logic elements of the unit, and the coding for unit information is therefore of the type in which the duration of pulses of constant amplitude equal to the supply voltage is modulated. Logic value "1" is coded by a high/low ratio of more than unity, and vice versa for logic level "0". The connection structure described with the return resistor, the switch block and the data receipt and transmission blocks are repeated in master unit 5 for the other communication conductors 11, 11', 11''. . . , for the other cables, and other corresponding members are indicated by the same numbers and indices.

Figure 3:
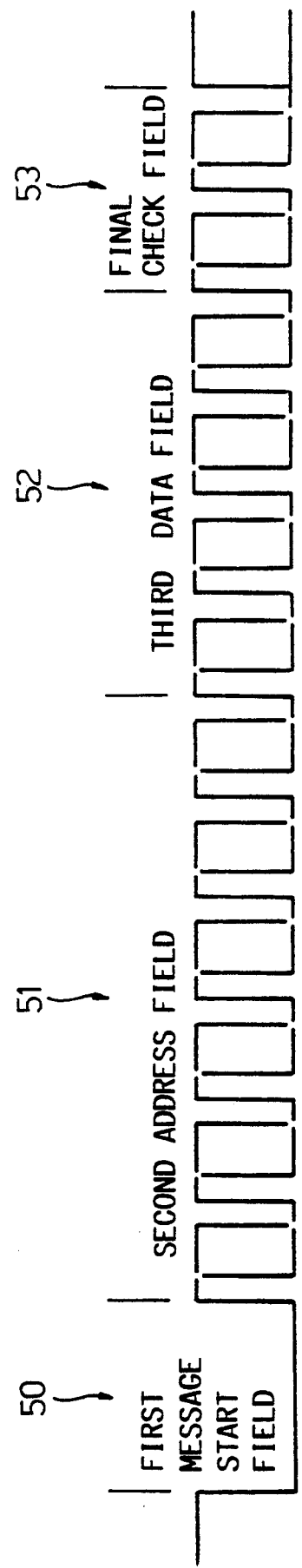
FIG. 3 is an illustration of a communication message between units in the system in FIG. 1.

The message sent by any one of units 5 or 27 on transmission conductor 11 has a characteristic time course shown in FIG. 3, in which starting from a "high" resting level of conductor 11, at which the transmission line is not occupied, there is a first message start field 50 in which transmission conductor 11 is altered to the "low" level by closing switch block 44 which is controlled by transmission block 45 of the corresponding unit initiating the exchange, then there is a second address field 51 conveniently consisting of six identification bits for the slave unit 27 which is transmitting, the logic level "1" or "0" of which is given by modulation of the closing time for switch block 44 controlled by block 45, then there is a third data field 52 conveniently consisting of four bits coding the command or message which has been transmitted, and a further check field 53 conveniently consisting of two redundant bits for checking that the message received is correct. Finally the transmission line is released by the transmitting unit and the signal on transmission conductor 11 returns to the "high" resting level.

A command from one of the slave units 27 to another (or several other) slave units 27 is transmitted via master unit 5 through steps which will be described with reference to FIG. 4 which shows their temperal sequence. Assuming for example that at an initial instant 0 a pulse is activated from switch unit 14 on door 2 to cause the window winding device 18 in door 2' to open (FIG. 1), initially slave unit 27 (indicated by A) associated with this switch device 14 on door 2 decodes the type of activation made and ascertains that no communication is already in progress on the transmission line by checking the voltage legvel in transmission conductor 11, which is at the high level when at rest as already described. If the level is high at instant t1 (1 msec) this slave unit 27 (A) transmits via transmission conductor 11 a coded message of the type illustrated in FIG. 3 containing its own identification code, the command code and the check field. At instant t2 (8 msec) the coded message is received by master unit 5, which may be "activated" by the first field 50 of this message to return to a fully operative condition from a resting stage of low power consumption in which it may be, and this master unit 5 checks that the message received is correct and that the corresponding command can be executed. If this is the case, at instant t3 (9 msec) this master unit 5 transmits a coded message, again of the type illustrated in FIG. 3, including the identification code for the slave unit 27 (B), the command code and the check field, along transmission conductor 11' which passes to slave units 27 including the unit 27 (indicated by B in FIG. 1) associated with the window winding device 18 on door 2'. At instant t4 (15 msec), the coded message is recognised by that slave unit 27 (B), which checks that the message received is correct, and if this is the case causes the window winding device to be activated. From that instant t4 slave unit 27 (B) controls the occupation of transmission conductor 11' by means of a low logic level signal corresponding to an extension of field 50 in FIG. 3 for a sufficient time (t4-t5, conveniently 3 msec), to allow the disturbances due to the start-up of the actuator control by that unit 27 (B) to dampen down, and then at instant t5 (18 msec) that slave unit 27 (B) transmits a coded message to master unit 5 via transmission conductor 11' containing its own identification code, the code for the status of the actuator controlled by that unit 27 (B), therefore indicating that implementation of the command has been activated, together with any diagnostic information, and the check field. At instant t6 (23 msec) the coded message is received by master unit 5, which checks that the actuation has been correctly activated, at instant t7 (25 msec) it transmits a coded message, again of the type illustrated in FIG. 3, comprising the identification code of the slave unit 27 (A) and code confirming that the actuation command for the selective device of unit 27 (B) has been transmitted (actuation in progress), along transmission conductor 11 which passes to slave units 27 including unit 27 (A) associated with the switch activated by the control device 14. At instant t8 (31 msec) the coded message is recognized by the slave unit 27 (A), and on conclusion of the communication cycle described this can then return to the resting state after confirming that the command has been executed.

In the event of a failure at any level of the chain in the abovementioned communication cycle, unit 27 or 5, which at that time is acting as a transmitter, on failing to receive replay messages or detect any activity on the transmission line, repeats the message for a finite number of times.

The advantages obtained with the communication system according to this invention are obvious from what has been described.

To begin with, the complexity of the transmission protocol and therefore the complexity of the slave units is very much reduced in comparison with a multimaster system. This makes it possible to use a smaller number of components to construct the said slave units (by way of indicating 10 to 60 in a local network), which is particularly advantageous for applications in motor vehicles, such as that described, where on account of mass production cost reductions are of major importance, and there is also a useful reduction in size enabling the units to be mounted directly on the various electromechanical devices.

Transmission can be initiated from any slave unit without having to have additional lines to request communication. This is particularly advantageous in applications in motor vehicles, like that described, where there must be a resting state in which overall minimum power consumption is guaranteed in order to avoid discharging the battery. In this state it is not possible to maintain an active master unit operating an interrogation or synchronization program as would be necessary with master/slave architecture. In the special application described it is necessary to be able to release all the door locks simultaneously following the manual release of one of these when the system is in the low power consumption state (vehicle parked and completely at rest).

There is a single master unit in which the programmed logic elements (e.g. The microprocessor) are concentrated. In general this assists the handling of all commands and/or enables for the functioning of various actuators, with resulting simplicity, reliability and flexibility of the system, and the possibility of identifying errors, in addition to the possibility of communicating with other intelligent systems.

As all messages must be received and transmitted by the master unit (unlike multimaster systems) the latter can operate degraded functioning modes in the event of a local fault, if a particular arrangement is selected for the various communication lines, for example the "star" arrangement illustrated in FIG. 1, where a plurality of groups of slave units are connected to corresponding communication lines which are in turn connected to the master unit as described in the Italian patent application lodged on the same date by the same applicant entitled: "Connection system between a master unit and slave units", the contents of which are incorporated in this description by simple reference where necessary. This may be done without recourse to duplicating the transmission line, which in the specific application of motor vehicles is one of the most frequent causes of a fault.

Other advantages are

The structure of the communication message is extremely simple. Only a single constant identification field 51 for each slave unit 27, functioning as an address or signature for the message which the slave unit must receive or has sent.

Data field 52 is reduced to a minimum (in fact, using only four bits, movement can be controlled in three axes, plus a power actuation for a given actuator, for example that of device 15 which electrically controls outside rear-view mirror 16), as there are no different possible interpretations of the data.

The structure of such a message makes it possible to activate any one of the units connected to the communication line from a resting condition whenever such a message is initiated, this being determined by the initial low level field 50, and to return to the low power consumption resting condition when the communication line is again free (detected by the high level logic signal for a predetermined time).

The structure of the communication may be handled simultaneously with communication structured in a different way, for example:
  a) it may coexist with cyclical interrogation (polling) of the slave units by the master unit, merely by authorising the latter to perform this function only after a period of time during which the communication line is free for a period longer than that specified for command transmissions in real time.
  b) the master unit may under certain conditions become transparent, allowing the possibility of direct transmission between slave units, or
  c) given the possibility of using a "star" connection arrangement centered on the master unit as described, any non-functioning communication branches can be isolated.

Finally, it is clear that modifications and variants may be applied to the embodiment of this invention described and illustrated without going beyond the scope of the inventive concept contained within it. For example the number and allocation of the connected devices indicated by way of example may be varied and the circuit configurations which have been illustrated by way of example in the diagrams may also be varied. In addition to this master unit 5 may have connections between the various communication conductors 11, 11', 11", . . . , other than those illustrated in FIG. 2, with communication interconnections as described in the abovementioned patent application entitled: "Connection system between a master unit and slave units".

We claim:

1. A connection system between at least one master unit and a plurality of slave units, comprising:
  a communication channel directly connected to said plurality of slave units and to said master unit, each slave unit of said plurality of slave units including logic means for exchanging communication messages with said master unit and for independently initiating transmission toward said master unit, said communication message has a preliminary field which can be used to activate said master and slave units from a resting state of minimum power consumption;
  said slave and master units are connected to said communication channel by means which force said communication channel to a different logical level when said communication channel is occupied by one of said master and slave units in order to send said communication message, said master and slave units detecting that said communication channel is in a free condition for the forwarding of said communication message by means for detecting said different logical level of said communication channel; and said master unit including means for receiving said communication message from one of said plurality of slave units and for sensing said communication message to another of said plurality of slave units.

2. A system according to claim 1, wherein said communication messages exchanged by said slave units with said master unit comprise a first field identifying a said slave unit and a second data field.

3. A system according to claim 2, wherein said first field identifies said slave unit which sent said communication in the event of transmission towards said master unit and identifies said slave unit which is to receive said communication in the case of transmission towards said slave unit.

4. A system according to claim 2, said second data field includes activation or control data for said slave unit and said master unit.

5. A system according to claim 2, wherein said first field consists of six bits and said second field consists of four bits.

6. A system according to claim 1, wherein said logical means include at least one data receipt means for detecting data signals on said communication channel, and at least one transmitting means for transmitting data signals on said communication channel.

7. A system according to claim 1, wherein transmission of said communication message is effected by means of an asynchronous serial protocol.

8. A system according to claim 7, wherein said transmission is effectuated by constant pulse height duration modulation.

9. A system according to claim 1, comprising groups of said slave units connected to corresponding communication lines connected to said master unit.

10. A system according to claim 9 wherein the number of said slave units in each of said groups of slave units is ten.

11. A system according to claim 9, wherein said master unit includes means for controlling the exchange of data signals between said communication lines.

12. A system according to claim 1, wherein said master unit includes a microprocessor.

13. A system according to claim 1, wherein said slave units are associated with electrical devices in a vehicle for activating or controlling at least one electrically functioning member in said electrical devices.

14. A system according to claim 13, comprising a first of said slave units is by means of said logical means capable of sending to said master unit a first communication message to actuate one of said electrical devices controlled by a second of said slave units, said master unit is capable of sending a second actuation command message for said second of said slave units, said second slave unit is capable of sending to said master unit a third message providing information about said actuation, and that said master unit is capable of sending to said first slave unit a fourth message confirming receipt of the actuation command from said second slave unit.

15. A system according to claim 13, wherein said slave units include at least one integrated circuit providing means for the distribution of electrical power for operation of said electrical devices, and means for the treatment of data signals relating to the functioning of said electrical devices.

16. A system according to claim 1, wherein said communication channel between said slave units and said master unit is provided by means of at least one electrical connection cable comprising a first conductor with a positive electrical power supply, a second conductor for the transmission of data signals and a third conductor which is connected to ground.

17. A system according to claim 16, wherein said at least one electrical connection cable includes a single one of said electrical connection cable for at least the said electrical devices associated with one door of a vehicle.

18. A system according to claim 17, wherein said devices associated with said one door include at least one window winding device, a door locking device and a manual control switch device.

19. A system according to claim 18, wherein said electrical devices associated with said one door also include an electrical device for electrical control of an outside rear-view mirror.

20. The system according to claim 1, wherein said preliminary field products a different logical level in said communication channel.

21. A connection system between at least one master unit and a plurality of slave units, comprising:

a communication channel directly connected to said plurality of slave units and to said master unit, each slave unit of said plurality of slave units including logic means for exchanging communication messages with said master unit and for independently initiating transmission toward said master unit, said slave units are associated with electrical devices in a vehicle for activating or controlling at least one electrically functioning member in said electrical devices; and said system further comprising a first of said slave units being by means of said logical means capable of sending to said master unit a first communication message to actuate one of said electrical devices controlled by a second of said slave units, said master unit is capable of sending a second actuation command message for said second of said slave units, said second slave unit is capable of sending to said master unit a third message providing information about said actuation, and that said master unit is capable of sending of said first slave unit a fourth message confirming receipt of the actuation command from said second slave unit.

22. A system according to claim 21 wherein said slave and master units are connected to said communication channel by means which force the said communication channel to a different logical level when said communication channel is occupied by one of said master and slave units in order to send said communication message.

23. A system according to claim 22, wherein said master and slave units detect that said communication channel is in a free condition for the forwarding of said communication message by means for detecting said different logical level of said communication channel.

24. A system according to claim 23, wherein said communication message has a preliminary field which can be used to activate said master and slave units from a resting state of minimum power consumption.

25. A system according to claim 24, wherein said preliminary field produces a different logical level in said communication channel.

* * * * *

UNITED STATES PATENT AND TRADEMARK OFFICE
CERTIFICATE OF CORRECTION

PATENT NO. : 5,121,386
DATED : June 9, 1992
INVENTOR(S) : Arturo Wolfsgruber, et al It is certified that error appears in the above-indentified patent and that said Letters Patent is hereby corrected as shown below:

Column 1, line 7, after "is" insert --,--.

Column 4, line 37, change "stage" to --state--.

Column 5, line 15, change "replay" to --reply--.

Column 5, line 49, change "The" to --the--.

Column 8, line 24 (claim 20), change "products" to --produces--.

Column 8, line 48 (claim 21), change "of", second occurrence, to --to--.

Signed and Sealed this

Nineteenth Day of April, 1994

Attest:

BRUCE LEHMAN

*Attesting Officer*　　　*Commissioner of Patents and Trademarks*